United States Patent [19]

Schneider, Jr.

[11] 4,295,415
[45] Oct. 20, 1981

[54] ENVIRONMENTALLY HEATED AND COOLED PRE-FABRICATED INSULATED CONCRETE BUILDING

[76] Inventor: Peter J. Schneider, Jr., R.D. #4, Boyertown, Pa. 19512

[21] Appl. No.: 67,090

[22] Filed: Aug. 16, 1979

[51] Int. Cl.³ .............................................. F24F 7/00
[52] U.S. Cl. .................................... 98/31; 52/309.12; 52/303; 52/405; 126/428
[58] Field of Search ............. 52/309.11, 309.12, 303, 52/304, 405, 612, 425, 439, 91; 98/31; 126/428, 429, 430, 431

[56] References Cited

U.S. PATENT DOCUMENTS

| | | | |
|---|---|---|---|
| 2,811,850 | 11/1957 | Clary | 98/31 X |
| 2,852,109 | 9/1958 | Pine | 98/31 X |
| 3,295,278 | 1/1967 | Muhm | 52/612 X |
| 3,343,474 | 9/1967 | Sohda et al. | 98/31 |
| 3,503,165 | 3/1970 | Hardt | 52/303 X |
| 3,633,659 | 1/1972 | Ohlsson | 98/31 X |
| 3,817,013 | 6/1974 | Selby | 52/612 X |
| 4,006,856 | 2/1977 | Nilsson | 98/31 X |
| 4,047,357 | 9/1977 | Mulholland et al. | 52/405 X |
| 4,054,246 | 10/1977 | Johnson | 126/431 X |
| 4,062,347 | 12/1977 | Jensen | 126/431 |

*Primary Examiner*—Price C. Faw, Jr.
*Assistant Examiner*—Carl D. Friedman
*Attorney, Agent, or Firm*—Michael F. Petock

[57] ABSTRACT

Environmentally heated and cooled pre-fabricated insulated concrete building is provided with a continuous layer of foamed insulation within all exterior walls. The building is constructed preferably of reinforced concrete having an outer and an inner wall connected together along the lower edge. Each section or unit of the wall is provided with an interlocking shape along the lateral edges for interlocking with adjacent panels or units. The walls are assembled at the job site and filled with a foam insulation. The outer concrete wall is provided with ducts therein and damper and blower controls which provide solar heating in cold weather and air circulation cooling in hot weather.

14 Claims, 9 Drawing Figures

ENVIRONMENTALLY HEATED AND COOLED PRE-FABRICATED INSULATED CONCRETE BUILDING

BACKGROUND OF THE INVENTION

The present invention relates to an environmentally heated and cooled pre-fabricated insulated concrete building. More particularly, the present invention relates to such a building in which a continuous layer of insulation is provided in all exterior walls and in which ducts are provided in the outer wall of each section for solar heating in cold weather and air cooling in hot weather.

There has been a great need for low cost, durable and efficiently heated and cooled housing. In recent years, the need for this type of housing has become more acute with the ever rising cost of conventional construction and the skyrocketing cost of energy for heating and cooling. The present invention provides a pre-fabricated concrete housing which may be assembled at a job site with a minimum of labor and which provides a durable, long lasting and energy efficient housing.

In the past, it has been known to construct buildings from pre-cast or pre-fabricated concrete building units. For example, U.S. Pat. No. 2,645,601-Tillery discloses a building wall construction in which pre-cast inner and outer wall units are mounted together by means of bolts at a job site. Tillery discloses the use of pockets of insulation in spaces between ribs formed on the inner wall. Tillery does not disclose unitary pre-cast elements having an inner and outer wall with the outer wall being provided with controlled air flow ducts useful for both heating and cooling of the structure.

SUMMARY OF THE INVENTION

The present invention provides an environmentally heated and cooled pre-fabricated insulated concrete building structure which is relatively inexpensive for use as housing both in terms of initial installation costs and in subsequent operation due to reduced energy consumption. The pre-cast or pre-fabricated building wall units may be manufactured in a factory environment and assembled on the building site with a minimum of skilled labor. The building structure of the present invention may be adapted for various uses such as human housing, factories, warehouses, chicken housing, etc.

In accordance with the present invention, the building wall is comprised of an inner and outer wall member connected together by a connecting member along their lower ends. The inner and outer wall members are constructed with said connecting member to form a space therebetween for the receiving of an insulating material. The wall units are preferably constructed of reinforced concrete. The inner and outer walls are provided with interlocking shapes along the lateral edges for interlocking with adjacent wall units when assembled at the building site. The wall units may be assembled to form a wall having a continuous and substantially uniform space between the inner and outer walls for receiving and forming a continuous and substantially uniform layer of insulation. The outer walls are provided with air ducts therein providing an air passage path between a lower point and a higher point of the outer wall. The air ducts are provided with a pair of controlled openings at the lower end for selectively communicating with the environment and the inside of the building formed by the building wall. Control means are provided for selectively placing the upper portion of the ducts in communication with the environment and the inside of the building. The controlled openings and the control means are selectively operable to provide heating or cooling of the building. Particularly, for heating of the building, the mass of concrete absorbs solar energy which is transferred to the interior of the building by lower and upper portions of the duct being in communication with the interior of the building. Cold air is taken from the floor area, rises through the outer wall where it is heated by the solar energy, and is dumped back into the interior of the building at a higher level. For cooling of the building, the ducts are selectively in communication with the environment at a lower and upper point wherein the air is circulated through the mass of the outer wall thereby providing a cooling effect. In other words, a relatively cool air enters at a lower portion and rises up through the duct as it draws heat from the concrete mass and is dumped into the environment at an upper point.

The heating and cooling ducts may preferably continue up through the outer walls and up through the outer wall of a roof structure. The ducts of the outer wall of the roof structure may be formed in the concrete or may be formed by a transparent structure mounted over grooves, ridges or other deformations formed in the outer surface of the outer wall of the roof structure.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figures 1, 2, 3, 5:
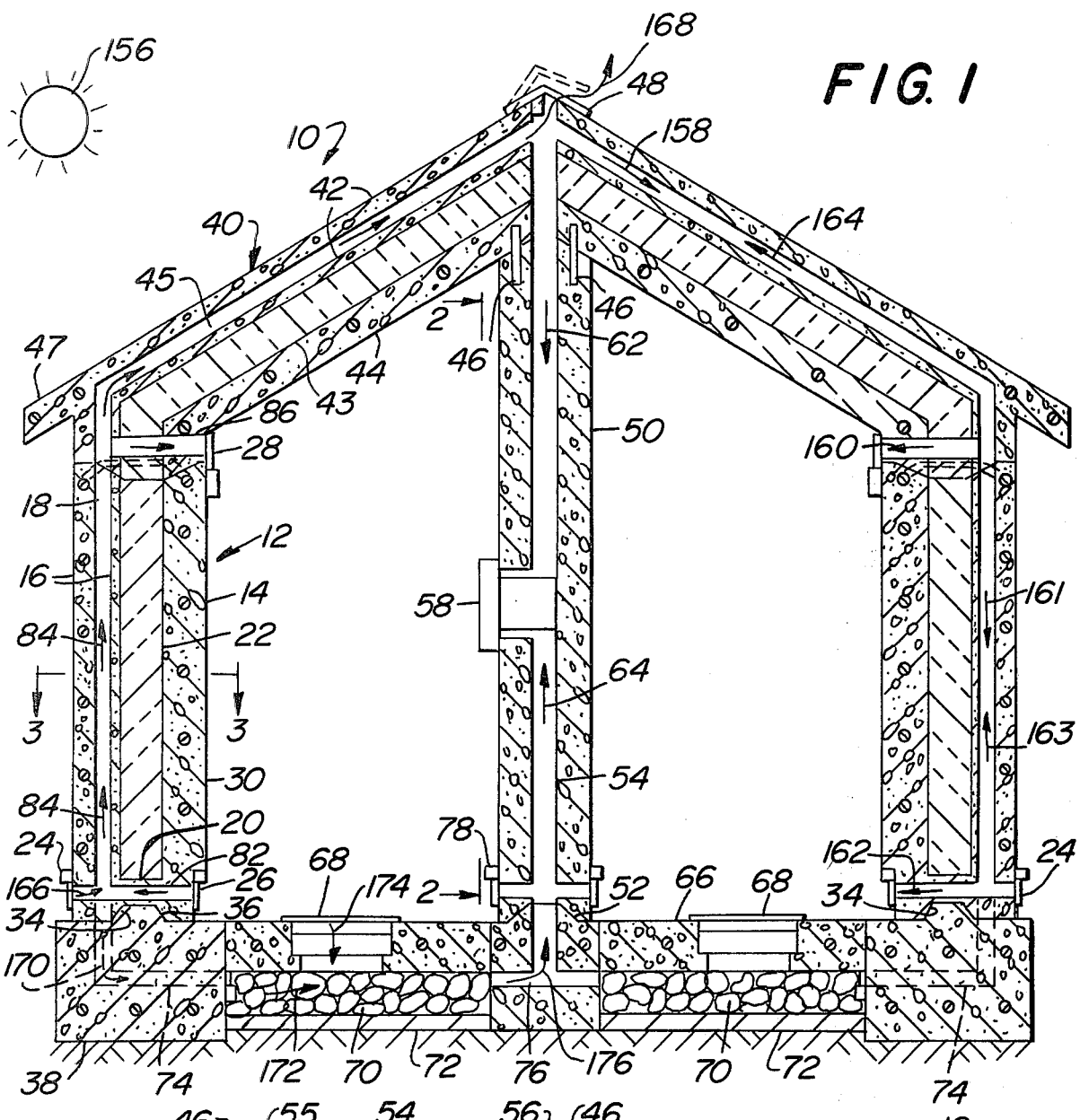
FIG. 1 is a cross-sectional view of an environmentally heated and cooled pre-fabricated insulated concrete housing in accordance with the present invention.
FIG. 2 is an elevation view taken along line 2—2 of FIG. 1.
FIG. 3 is a cross-sectional view taken along line 3—3 of FIG. 1.
FIG. 5 is a cross-sectional view of an alternate and preferred embodiment of the outer wall of a roof structure in accordance with the present invention.

Referring now to the drawings where like numerals indicate like elements, there is shown in FIG. 1 an environmentally heated and cooled pre-fabricated insulated concrete building structure 10. Exterior wall units 12 are comprised of an inner wall 14 and an outer wall 16, having ducts 18 therein, connected together at their lower ends by a connecting member 20. The inner and outer walls are spaced from each other by a uniform distance to provide a space for insulation 22. The space between inner wall 14 and outer wall 16 may be selected to provide the desired amount of insulation, and may for example be in the neighborhood of 4 to 6 inches. Preferably, the insulation is of a foamed type of insulation which may be installed at the building site once the exterior walls have been erected.

Duct 18 at its lower end is selectively in communication with the environment through controlled opening 24 and is selectively in communication with the interior through controlled opening 26. The upper end of duct 18 is selectively in communication with an upper portion of the room through controlled opening 28 or with the atmosphere through the ducting contained in the roof structure as will be described more fully hereinafter.

Exterior wall units 12 may be cast from a castable material such as concrete, which may be of a special light weight type of concrete. Exterior wall units 12 may be pre-cast with door and window openings therein. The ducts are also formed in the outer wall 16 during the casting process. Preferably, the walls may be reinforced by reinforcing bars 30 or wire mesh. The lower portion of inner wall 14 may be provided with an indentation 26 for ease in installation of baseboard heating and the running of electrical cables and plumbing. The lower portion of the wall units are provided with a slot or groove 34 which mates with key 36 of footing 38. The upper portions of the wall units 12 may be provided with steel ties 31 welded to reinforcing bars 30 for helping to hold the inner walls 14 and outer walls 16 a predetermined distance apart. The ties 31 are useful in providing a convenient means for attaching a crane hook to the upper ends of wall units 12. The ties 31 may fit into indentations in the roof structure.

Figure 4:
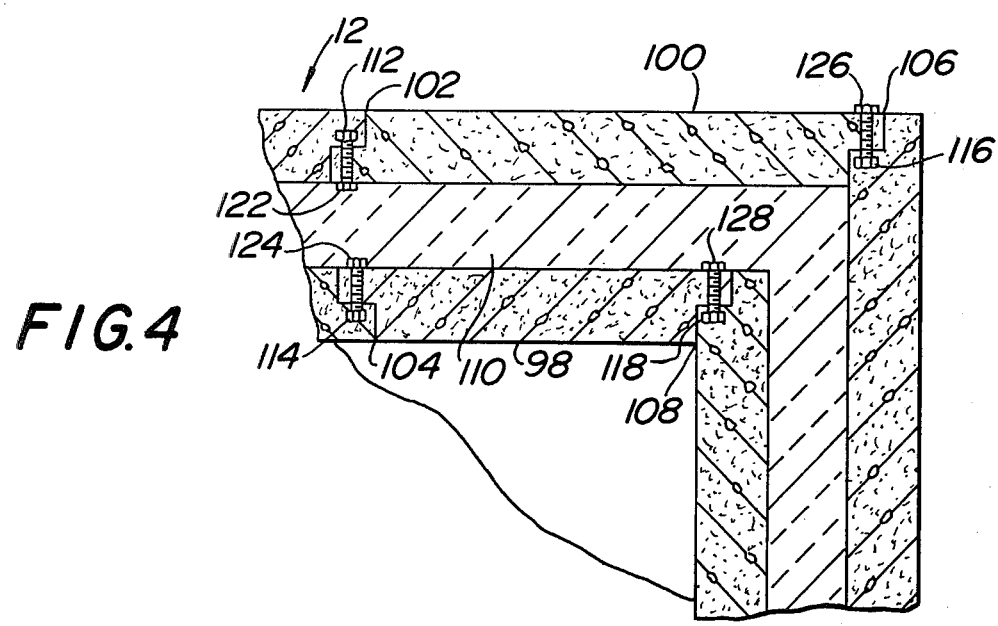
FIG. 4 is a cross-sectional view of a corner structure of the walls in accordance with the present invention.
Figure 6:
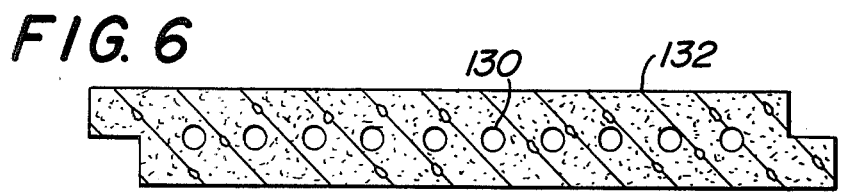
FIGS. 6 through 9 are cross-sectional views of alternate embodiments of outer wall structures in accordance with the present invention.

The exterior wall units 12 are provided with an interlocking shape along their lateral edges for interlocking with adjacent exterior wall or panel units. One preferred and suitable form of the interlocking shape along the lateral edges may be seen in FIGS. 3 and 4 wherein FIG. 3 illustrates a straight length of wall and FIG. 4 illustrates the structure at a corner. Referring to FIG. 3, there is shown exterior wall unit 12 having an indented form 90 of exterior wall 16 and an oppositely arranged indented form 92 on interior wall 14. The indentations 90 and 92 form an interlocking lateral edge for wall unit 12 in which the outermost portions of exterior wall 16 and interior wall 14 project. At the opposite end of the same exterior wall unit 12, the indentations at 94 and 96 are reversed so that the innermost portions of exterior wall 16 and interior wall 14 project thereby mating with an adjoining exterior wall unit 12.

Referring now to FIG. 4, there is shown an arrangement of the interlocking wall units at a corner and also illustrating a preferred means in which the wall units or panels may be secured together by means of bolts at the joints. Exterior wall units 12 shown in FIG. 4 are shown without ducts. Although the structure of the present invention may be utilized without environmental heating and cooling aspects of the present invention, utilization of ducts enabling such environmental heating and cooling are preferable. As shown in FIG. 4, inner wall 98 and outer wall 100 are provided with the interlocking edge shapes at 102, 104, 106 and 108 as discussed with respect to FIG. 3. However, it is noted, that for a corner section, a special unit is used with a shortened inner wall 98. Nuts 112, 114, 116 and 118 are cast in the concrete and may be physically connected, for example by means of welding, to the reinforcing structure (not shown) in the concrete. The threads in the nuts may be protected from being filled with concrete by suitable means, such as filling them with petroleum jelly prior to casting or by other suitable well known means. Bolts 122, 124, 126 and 128 are inserted and tightened after the wall units 12 are assembled at the building site. A special type of wrench may be used to insert and tighten bolts at low points in the wall 12 prior to the filling of the space between the inner wall 98 and outer wall 100 with insulation 110.

Figure 7:
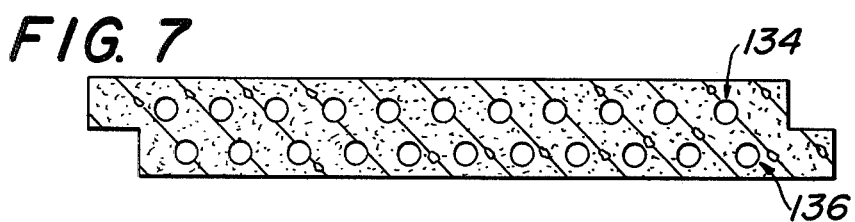
Figure 8:
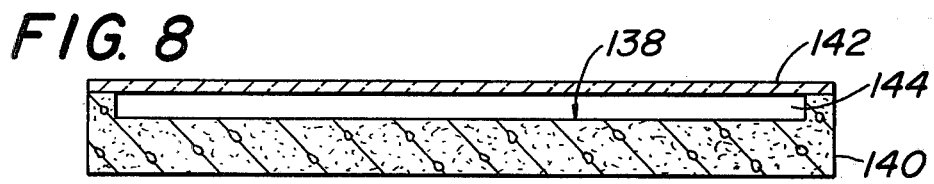
Figure 9:
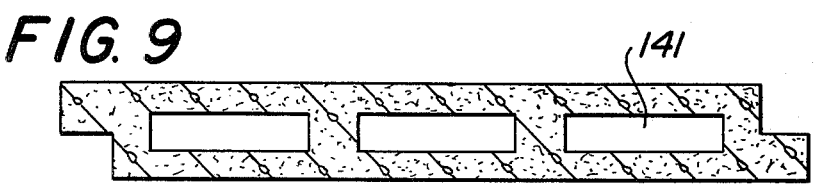

Other forms of arranging the ducts in the outer wall are shown in FIGS. 6 through 9. For example, in FIG. 6, ducts 130 are formed by a plurality of evenly spaced tubular duct elements substantially centered in the outer wall 132 of an exterior wall unit. It is understood in FIGS. 6 through 9 that the insulation layer and an inner wall would also be formed together and are not shown in these figures as they would be merely duplicative. In FIG. 7, there are a plurality of rows of ducts, there being illustrated an outer row 34 and an inner row 136. FIG. 8 illustrates another embodiment of the ducts in the outer wall wherein the casting of the concrete is simplified as tubular passageways through the concrete are eliminated. Another advantage of the embodiment shown in FIG. 8 is that it has a high efficiency as the surface 138 may be provided with a high heat absorbing black coating which is nevertheless substantially hidden from view. In the embodiment of FIG. 8, the concrete 140 is provided with a transparent or translucent cover material 142 which allows solar radiation to penetrate it and to be absorbed by the black coating 138. Air is circulated through duct 144 wherein it absorbs the heat from the hot surface 138. FIG. 9 is an embodiment having ducts 141 in it similar to that shown in FIGS. 1 and 3.

The exterior wall units 12 may be used with a conventional flat type roof or any other suitable type of roof. However, in the preferred embodiment, a roof structural unit 40 is provided which has an outer roof concrete wall 42 and an inner ceiling concrete wall 44. The outer roof wall of structure 42 is provided with a duct network comprised of ducts 45. The outer roof wall structure 42 and the inner ceiling wall structure 44 are spaced a predetermined distance apart and provided with insulation therebetween. The roof structural unit 40 is supported near its lower end on exterior wall units 12 and at its upper end by a center concrete support wall 50. Roof structural unit 40 may be physically tied to center wall 50 by means of pins 46. The gable roof is provided with a controlled opening 48 at its apex. Controlled opening 48 may be maintained in a closed condition for heating and opened for cooling.

The gable roof structure is provided with eaves 47. The length of the eaves 47 may be varied in length to suit the climate in which the building is to be located. For example, in Southern locations where cooling is a greater concern than heating, the eaves 47 may be constructed to be longer to provide shading of the exterior walls 12.

Center support wall 50 is provided with a keyway 52 for mating with a suitable footing support. Center wall 50 is provided with ducts 54, 55 and 56 as may be seen in FIGS. 1 and 2. Center wall 50 is provided with blower units 58, 59 and 60 mounted in the center wall ducts as may be seen in FIGS. 1 and 3. Blowers 58, 59 and 60 are of the reversible type which may move air downwardly through center wall 50 as shown by arrow 62 or upwardly through center wall 50 as shown by arrow 64.

A concrete floor 66 is provided having air register openings 68. Underneath the concrete floor 66 is provided a mass 70 for the storage of heat or the absence of heat (cold) during heating and cooling, respectively. The storage 70 is preferably comprised of an inexpensive and readily available mass such as stone. Heat/cold storage 70 is preferably insulated from the ground by a layer of insulation 72. The heat/cold storage 70 is in communication with ducts 18 through ducts 74 in the footings and in communication with center wall duct 54 through duct 76, in addition to being in direct communication with the interior of the building through air register openings 68. Additionally, center wall duct 54 is in communication with the interior of the building through controlled opening 78, center walls ducts 55 and 56 being likewise provided with controlled openings 77 and 79.

Although FIG. 1 illustrates the air ducts in roof structure 40 to be formed in the outer wall 42, it is understood that a preferred embodiment of the roof structure is to form the ducts without tubular ducts being formed within the outer wall of concrete. A preferred embodiment of the outer wall is illustrated in FIG. 5 wherein the concrete outer roof wall 146 is provided with undulations, corrugations or grooves 148 in its outer surface and these are coated with a black heat absorbing material 150. A solar energy transparent cover 152 is provided over the grooves. Preferably, the transparent cover 152 is provided with opposite undulations, which might be said to be 180° out of phase with those of the concrete, to provide a maximum air flow capability of ducts 151. The transparent cover material 152 may be formed of large sheets with the required undulations or they may be individual units fastened to the concrete 146 by means of pins 154 as illustrated.

In operation, when it is desired to heat the interior of the building, the outer wall 16 of exterior wall 12 and the outer wall 42 of roof structural unit 40 are heated by the sun's rays. The heat and/or cold from the environment is insulated from the interior of the building by reason of insulation layer 22 in exterior wall 12 and insulation layer 43 in roof structural unit 40. The structure of the building 10 is constructed of a substantial concrete mass such that it absorbs and retains a significant amount of heat when heated by solar radiation. The retention of heat or cold by the substantial mass provides an important "flywheel effect" or moderation in temperature variations. During the heating cycle, controlled openings 26 and 28 are opened by temperature responsive control means. The control means preferably includes electronic circuitry, preferably microchip circuitry, and thermal sensors which automatically open and close the various controllable openings by a program so that the heating and/or cooling system operates efficiently and effectively during all seasons of the year and during the day and night.

With controlled openings 26 and 28 being in the open condition, air flow circulates in the direction of arrows 82, 84 and 86, taking cooler air from the lower area near the floor of the building, up through duct 18 where it is heated by solar radiation impinging upon the outer surface of exterior wall 16 and back into the building at an upper area through controlled opening 28 which is in the open condition. This air flow may be assisted by a small blower. However, in the preferred embodiment, sufficient circulation would be generated by thermal conditions in which the heated air would naturally rise in duct 18. During the heating operation, controlled opening 24 is in the closed condition.

The rising heated air in duct 18, in addition to exiting through controlled opening 28, also rises up through duct 45 and down duct 54 in the center of center supporting wall 50 as shown by arrow 62. The heat from the heat air may be stored in heat storage 70, which as described above, may be comprised of a conventional heat storage made of stone. This heat storage provides a warming of the floor 66 of the building. The warming of the floor in a building has a significant effect on increasing the comfort and feeling of warmth in a building. Furthermore, the heat stored in heat storage 70 may be drawn out during the night by means of forcing air flow by means of blower 58 through the storage unit 70 and up through center support duct 54 in the direction of arrow 64. The heated air flowing through center support duct 54 causes center support wall 50 to act as a giant radiator radiating heat into the interior of the building.

Under certain circumstances, such as may become necessary because of required positioning of the building and at certain latitudes, where the sun may perhaps only irradiate the left side and the left half of the roof of the building as shown in FIG. 1, assuming a sun position as shown at 156 in FIG. 1, air flow may be forced by means of a blower assembly, now shown, under the control of the control means to force heated air in the direction of arrows 158, 160, 161 and 162, thereby forcing heated air directly into the right side of the building. During normal heating conditions, that is where the right hand side of the building is also irradiated by the sun, the normal heated air flow pattern would be in the direction of arrows 163 and 164 and similar to that described with respect to the left side.

When it is desired to cool the building by the use of the environment, at least in large part, controlled openings 26 and 28 are closed. Controlled openings 24 and 48 are opened. Air flow proceeds in the direction of arrow 166, arrows 84 and arrow 168. Controlled opening 48 is in the open position as shown in dotted outline. Cool air from near the ground in the environment therefore passes up through the ducts and out into the environment. At the very minimum, this prevents the concrete structure from heating. Air flow also passes in the direction of arrows 166, 170, 172, 176 and 64. The air flows through cold storage 70 where the air is cooled. The cooled air passing up through duct 54 causes the center support wall 50 to act as a giant radiator cooling the interior of the building. Further, air flow into cold storage 70 is received through register 68 as shown by arrow 174.

The present invention may be embodied in other specific forms without departing from the spirit or essential attributes thereof and, accordingly, reference should be made to the appended claims, rather than to the foregoing specification as indicating the scope of the invention.

I claim:

1. A building wall construction comprising exterior wall units constructed of an inner and an outer wall forming a space therebetween with said inner and outer walls being joined by a connecting member along their lower ends, said inner and outer walls being composed of reinforced concrete, said inner and outer walls being provided with an interlocking shape along their lateral edges for interlocking with an adjacent wall unit; said wall unit being assemblable to form a wall having a continuous and substantially uniform space between said inner and outer walls for receiving and forming a continuous and substantially uniform layer of insulation; said outer walls being provided with air ducts therein providing an air passage path between a lower point and a higher point of said outer wall, said air ducts being provided with a pair of controlled openings at its lower end for selectively communicating with the environment and the inside of the building formed by the building wall, control means for selectively placing the upper portion of said ducts in communication with the environment and the inside of the building, said controlled openings and said control means being selectively openable to provide heating or cooling of the building.

2. A building wall construction in accordance with claim 1 wherein said air ducts are formed as tubular holes in said outer wall.

3. A building wall construction in accordance with claim 1 wherein said air ducts are comprised of undulations or grooves formed in the outer surface of said outer wall with said outer surface being provided with a black heat absorbing covering, said undulations or grooves being covered with a substantially transparent cover.

4. A building wall construction in accordance with claim 1 wherein said inner and outer walls are connected together near their upper ends by connecting members connected to reinforcing elements in said walls.

5. A building wall construction in accordance with claim 1 wherein said insulation is foamed in situ between said inner and outer walls.

6. A roof structural unit of a gable type roof, comprising: an inner ceiling structure and an outer roof structure composed of reinforced concrete, said roof structure being adapted to mate with the upper end of a plurality of outer concrete wall units, said concrete roof structure being adapted to mate at the peak of the cable with a supporting internal center concrete wall units and being securely mated thereto by pin means, said lower end being provided with an extension for overhanging the outside of said outer wall units by a predetermined distance to form eaves, said outer roof structure being provided with ducts for the passage of air, said ducts being formed to connect with ducts in the wall units at a lower point on the roof structure and being selectively in communication by means of a controllable damper with the environment, ducts in the opposing gable roof structure of the building or ducts in said center wall supporting the peak of the gable roof whereby air flow through the ducts may be selectively controlled for heating or cooling the building.

7. A roof structural unit in accordance with claim 6 wherein said air ducts are formed as tubular holes in said outer wall.

8. A roof structural unit in accordance with claim 6 wherein said ducts are comprised of undulations or grooves formed in the outer surface of said outer wall with said outer surface being provided with a black heat absorbing covering, said undulations or grooves being covered with a substantially transparent cover.

9. A roof structural unit in accordance with claim 8 wherein said depressions in the outer surface of the outer concrete wall are corrugated in form and said transparent cover element is corrugated in form with said corrugations being of opposed form.

10. A prefabricated building construction for extracting heat from the environment for heating and extracting a cooling effect from the environment for cooling, comprising:

a concrete structure having a substantial mass; said walls of said building structure being comprised of an inner and outer wall of concrete connected together at or near their lower ends; said concrete units having interlocking shapes on lateral edges of the inner and outer walls for interlocking with adjacent units and enabling the forming of a continuous and substantially uniform space between the inner and outer walls for the placement of insulation; said units being mounted on keyed concrete footings, said lower end of the unit having a keyed shape for mating with the keyed unit of the concrete footings; said building being provided with a concrete floor having ducts therein for the circulation of air; a cold/heat storage unit being provided underneath said concrete floor; said building providing a circulation path for heating from a lower portion of the interior of the building up through the outer wall and back into the building at a higher elevation; said building providing an air passage path communicating with the environment at a lower point in the outside wall and having air passage up through the outer wall and in communication with the environment at a higher elevation.

11. A building structure in accordance with claim 10 including a gable roof structure having an inner wall and an outer wall separated by a layer of insulation; said outer wall of said roof structure having air ducts; said air ducts of said wall units being in communication with the air ducts in the outer wall of the roof structure; said air flow continuing at least in part up through said ducts of the outer wall of said roof structure and being controllable at the peak of the roof for selectively dumping into the environment for a cooling effect or being selectively channeled into other portions of the building during a heating cycle.

12. A prefabricated building construction in accordance with claim 10 wherein said air passage path in said outside wall is formed by an indentation in the outer surface of the concrete wall, said outer surface of the concrete wall being provided with a heat absorbing black covering and said indentation being covered with a material transparent to solar radiation.

13. A building structure in accordance with claim 10 wherein said insulation is of the type which may be foamed in place.

14. A prefabricated building construction in accordance with claim 10 wherein said inner and outer walls are provided with ties connecting them at or near their upper ends.

* * * * *